United States Patent
Davey et al.

[11] Patent Number: 6,151,889
[45] Date of Patent: Nov. 28, 2000

[54] CATALYTIC MONITORING METHOD

[75] Inventors: Christopher Kirk Davey, Novi; Robert Joseph Jerger, Dexter; David Robert Nader, Farmington Hills; Michael Igor Kluzner, Oak Park, all of Mich.

[73] Assignee: Ford Global Technologies, Inc., Dearborn, Mich.

[21] Appl. No.: 09/175,111

[22] Filed: Oct. 19, 1998

[51] Int. Cl.⁷ ..................................................... F01N 3/00
[52] U.S. Cl. .............................................. 60/277; 60/274
[58] Field of Search ...................................... 60/274, 277

[56] References Cited

U.S. PATENT DOCUMENTS

| | | | |
|---|---|---|---|
| 5,261,230 | 11/1993 | Yuuki et al. | 60/277 |
| 5,357,751 | 10/1994 | Orzel . | |
| 5,385,016 | 1/1995 | Zimlich et al. | 60/277 |
| 5,544,481 | 8/1996 | Davey et al. | 60/274 |
| 5,979,160 | 11/1999 | Yashiki et al. | 60/277 |

FOREIGN PATENT DOCUMENTS

6-167210  6/1994  Japan .

*Primary Examiner*—Thomas Denion
*Assistant Examiner*—Tu M. Nguyen
*Attorney, Agent, or Firm*—Allan J. Lippa; John D. Russell

[57] ABSTRACT

A catalytic monitoring method for an engine having two engine banks of which each coupled to one of two catalytic converters using first and second exhaust gas oxygen sensors, respectively upstream and downstream of one catalytic converter. Third and fourth exhaust gas oxygen sensors are respectively coupled upstream and downstream of the other catalytic converter. Switch ratios are determined for each of the engine banks based on the switching ratios of each upstream and downstream pair of exhaust gas oxygen sensors. A combination of the switch ratios is used to determine overall catalytic converter system performance.

11 Claims, 8 Drawing Sheets

CATALYTIC MONITORING METHOD

FIELD OF THE INVENTION

The invention relates to catalytic converter monitoring systems of internal combustion engines responsive to exhaust gas oxygen sensors before and after the catalytic converters.

BACKGROUND OF THE INVENTION

To meet current emission regulations, automotive vehicles must have on-board diagnostic systems to detect the malfunction of any component of the emission system, including a catalytic converter. A vehicle containing more than one catalytic converter may monitor each catalytic converter to guarantee detection of degraded system performance. An example would be that of a vehicle containing a V-type engine where catalytic converters coupled near or close to the engine are used. In this system, each catalytic converter may be monitored to determine emission compliance.

Catalytic converter monitoring systems are known in which an upstream and a downstream exhaust gas oxygen sensor are compared to give an indication of catalytic degradation. If sufficient degradation occurs, these systems will diagnose the deteriorated performance and illuminate a malfunction indicator. As a result, a new catalytic converter will be required. In the example of a V-type engine using two close coupled catalytic converters, each being monitored, when the measured performance of either of the two catalytic converters falls below a predetermined threshold, a malfunction is indicated. An example of such an approach is disclosed in U.S. Pat. No. 5,357,751.

The inventors herein have recognized numerous problems with the above approach. For example, in systems containing a dual bank engine connected to two monitored catalytic converters, the catalytic converters may not age at the same rate. Thus, one catalytic converter may have degraded past a threshold indicating possible reduced performance while the other is operating with much higher performance. While the total emissions of the vehicle are still within allowable amounts, a malfunction is indicated because one of the catalytic converters has degraded much faster than the other.

SUMMARY OF THE INVENTION

An object of the invention claimed herein is to provide a catalytic converter monitoring method capable of accounting for variations in catalytic converter aging between two converters, each coupled to separate engine banks.

The above object is achieved, and problems of prior approaches overcome, by the method shown in claim 1. In one particular aspect of the invention, the method comprises measuring a first number of transitions from a first state to a second state of a first exhaust gas oxygen sensor upstream of the first catalytic converter, measuring a second number of transitions from said first state to said second state of a second exhaust gas oxygen sensor downstream of the first catalytic converter, measuring a third number of transitions from said first state to said second state of a third exhaust gas oxygen sensor upstream of the second catalytic converter, measuring a fourth number of transitions from said first state to said second state of a fourth exhaust gas oxygen sensor downstream of the second catalytic converter, and determining a degradation of the first and second catalytic converters derived from a combination of a first ratio between said first and second number of transitions and a second ratio between said third and number of transitions.

By using a combination of the first ratio and second ratio, a total system performance can be inferred, leading to more accurate catalytic converter monitoring. For example, when the first upstream and first downstream exhaust gas oxygen sensors are coupled to one bank of an engine and the second upstream and second downstream exhaust gas oxygen sensors are coupled to another bank, the combination of the first and second ratios can detect when the catalytic converters are aging unequally. This information can be used to provide a malfunction indication when the total system degradation has reached a predetermined level.

An advantage of the present invention is the ability to more accurately determine the total catalytic converter system performance for systems having multiple converters.

Another advantage of the present invention is the reduction in false malfunction indications.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
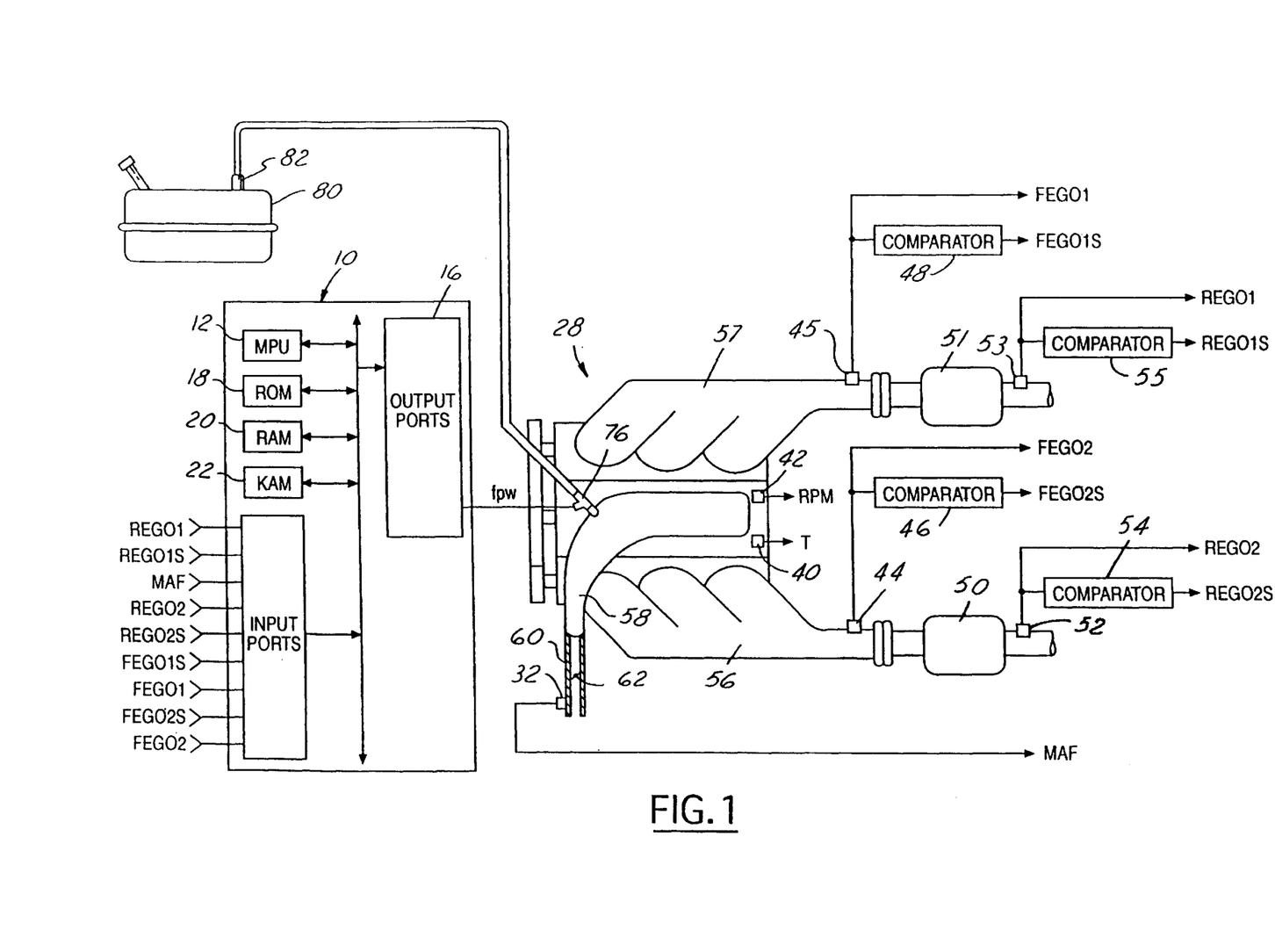
FIG. 1 is a block diagram of an embodiment wherein the invention is used to advantage.

Controller 10 is shown in the block diagram of FIG. 1 as a conventional microcomputer including: microprocessor unit 12, input ports (not shown) output ports 16, read-only memory 18, for storing the control program; random access memory 20 for temporary data storage which may also be used for counters or timers; keep-alive memory 22, for storing learned values; and a conventional data bus.

Controller 10 is shown receiving various signals from sensors coupled to engine 28 including; measurement of inducted mass airflow (MAF) from mass airflow sensor 32; engine coolant temperature (T) from temperature sensor 40; and indication of engine speed (rpm) from tachometer 42. In this example, engine 28 is a V-type engine having first and second banks (not shown) coupled to respective first and second exhaust manifolds (57,56).

Output signal FEGO1 from conventional exhaust gas oxygen sensor 45, positioned upstream of first catalytic converter 51, is compared to a reference value associated with stoichiometry in comparator 48 for providing output signal FEGO1S. Signal FEGO1S is a two-state signal which is a predetermined high voltage when exhaust gases are rich of stoichiometry and a predetermined low voltage when exhaust gases are lean of stoichiometry. Both signal FEGO1 and signal FEGO1S are coupled to controller 10.

Output signal FEGO2 from conventional exhaust gas oxygen sensor 44, positioned upstream of second catalytic converter 50, is compared to a reference value associated with stoichiometry in comparator 46 for providing output signal FEGO2S. Signal FEGO2S is a two-state signal which is a predetermined high voltage when exhaust gases are rich of stoichiometry and a predetermined low voltage when exhaust gases are lean of stoichiometry. Both signal FEGO2 and signal FEGO2S are coupled to controller 10.

Another conventional exhaust gas oxygen sensor (53) is shown coupled to exhaust manifold 57 downstream of catalytic converter 51 and provides signal REGO1 to controller 10 which is related to oxygen content in the exhaust gases. Output signal REGO1 is also compared to a reference value associated with stoichiometry in comparator 55 for providing two-state output signal REGO1S to controller 10. Signal REGO1S is preselected high voltage when exhaust gases downstream of catalytic converter 51 are rich of stoichiometry and a low preselected voltage when such exhaust gases are lean of stoichiometry.

Yet another conventional exhaust gas oxygen sensor (52) is shown coupled to exhaust manifold 56 downstream of catalytic converter 50 and provides signal REGO2 to controller 10 which is related to oxygen content in the exhaust gases. Output signal REGO2 is also compared to a reference value associated with stoichiometry in comparator 54 for providing two-state output signal REGO2S to controller 10. Signal REGO2S is preselected high voltage when exhaust gases downstream of catalytic converter 50 are rich of stoichiometry and a low preselected voltage when such exhaust gases are lean of stoichiometry.

Referring now to FIG. 1, intake manifold 58 of engine 28 is shown coupled to throttle body 60 having primary throttle plate 62 positioned therein. Throttle body 60 is also shown having fuel injector 76 coupled thereto for delivering liquid fuel in proportion to the pulse width of signal fpw from controller 10. Fuel is delivered to fuel injector 76 by a conventional fuel system including fuel tank 80, fuel pump 82, and fuel rail 84.

Figure 2:
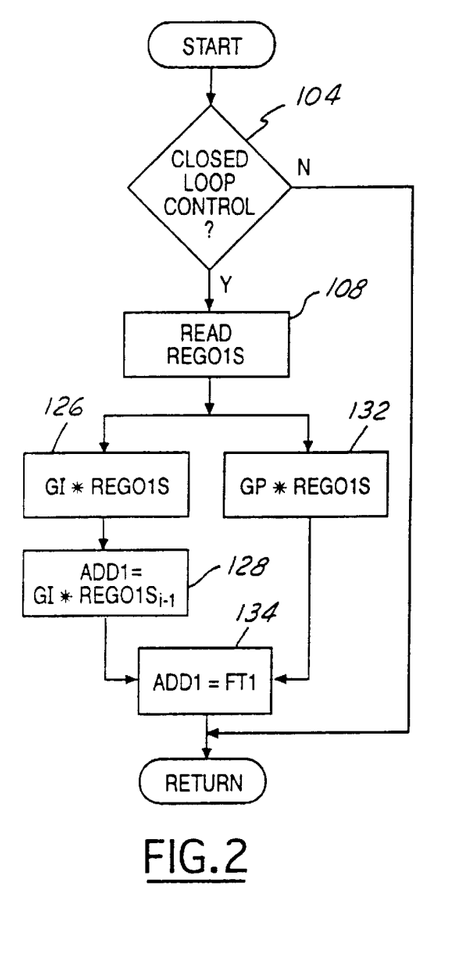
FIGS. 2–8 are high level flow charts of various operations performed by a portion of the embodiment shown in FIG. 1.

Referring now to FIG. 2, a flowchart of a routine performed by controller 10 to generate fuel trim signal FT1 for the first bank of engine 28 is now described. A determination is first made whether closed-loop air/fuel control is to be commenced (step 104) by monitoring engine operation conditions such as temperature. When closed-loop control commences, signal REGO1S is read from comparator 55 (step 108) and subsequently processed in a proportional plus integral controller as described below.

Referring first to step 126, signal REGO1S is multiplied by gain constant GI and the resulting product added to products previously accumulated ($GI*REGO1S_{i-1}$) in step 128. Stated another way, signal REGO1S is integrated each sample period (i) in steps determined by gain constant GI. During step 132, signal REGO1S is also multiplied by proportional gain GP. The integral value from step 128 is added to the proportional value from step 132 during addition step 134 to generate fuel trim signal FT1.

Figure 3:
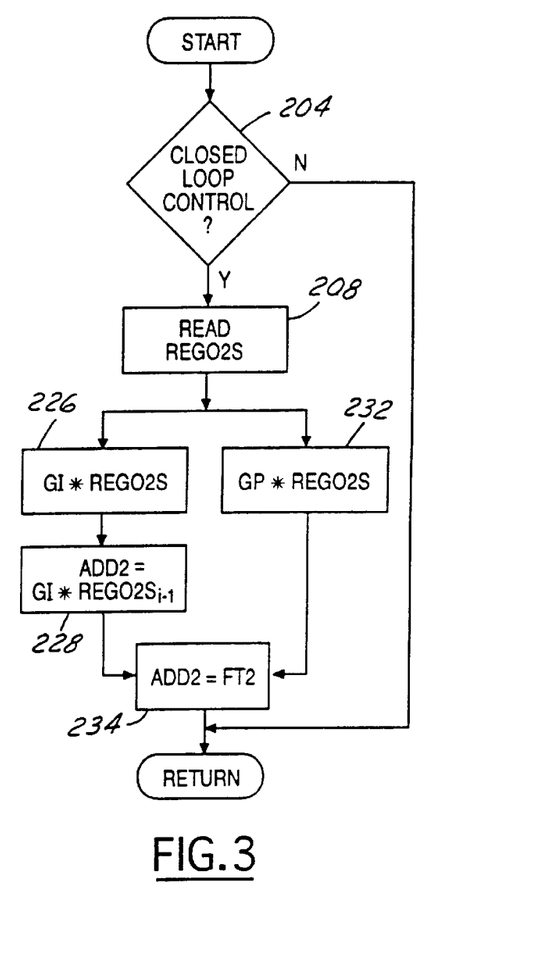

Referring now to FIG. 3, a flowchart of a routine performed by controller 10 to generate fuel trim signal FT2 for the second bank of engine 28 is now described. A determination is first made whether closed-loop air/fuel control is to be commenced (step 204) by monitoring engine operation conditions such as temperature. When closed-loop control commences, signal REGO2S is read from comparator 54 (step 208) and subsequently processed in a proportional plus integral controller as described below.

Referring first to step 226, signal REGO2S is multiplied by gain constant GI and the resulting product added to products previously accumulated ($GI*REGO2S_{i-1}$) in step 228. Stated another way, signal REGO2S is integrated each sample period (i) in steps determined by gain constant GI. During step 232, signal REGO2S is also multiplied by proportional gain GP. The integral value from step 228 is added to the proportional value from step 232 during addition step 234 to generate fuel trim signal FT2.

Figure 4:
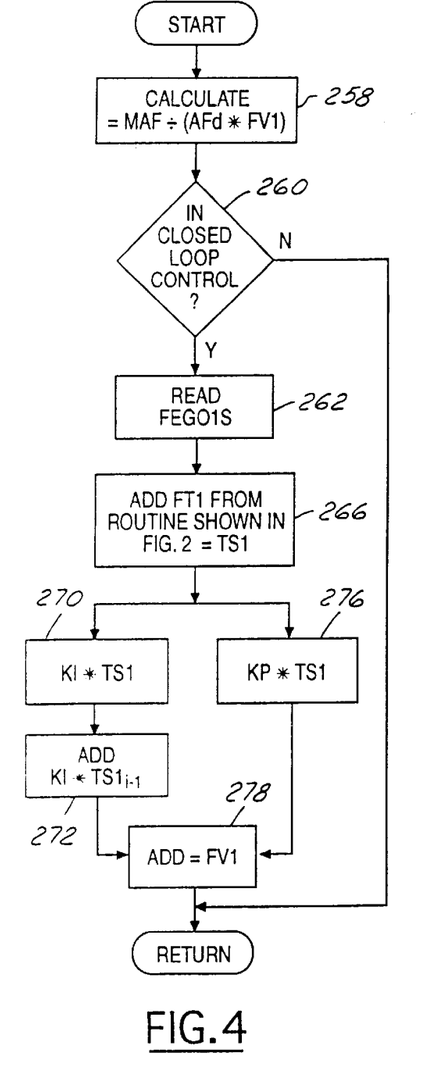

The routine executed by controller 10 to generate the desired quantity of liquid fuel delivered to the first bank of engine 28 and trimming this desired fuel quantity by a feedback variable related both to sensor 45 and fuel trim signal FT1 is now described with reference to FIG. 4. During step 258, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV1.

After determination that closed-loop control is desired (step 260) by monitoring engine operating conditions such as temperature (T), signal FEGO1S is read during step 262. During step 266, fuel trim signal FT1 is transferred from the routine previously described with reference to FIG. 2 and added to signal FEGO1S to generate trim signal TS1.

During steps 270–278, a conventional proportional plus integral feedback routine is executed with trimmed signal TS1 as the input. Trim signal TS1 is first multiplied by integral gain value KI (step 270), and the resulting product added to the previously accumulated products (step 272). That is, trim signal TS1 is integrated in steps determined by gain constant KI each sample period (i) during step 272. A product of proportional gain KP times trimmed signal TS1 (step 276) is then added to the integration of $KI*TS1$ during step 278 to generate feedback variable FV1.

Figure 5:
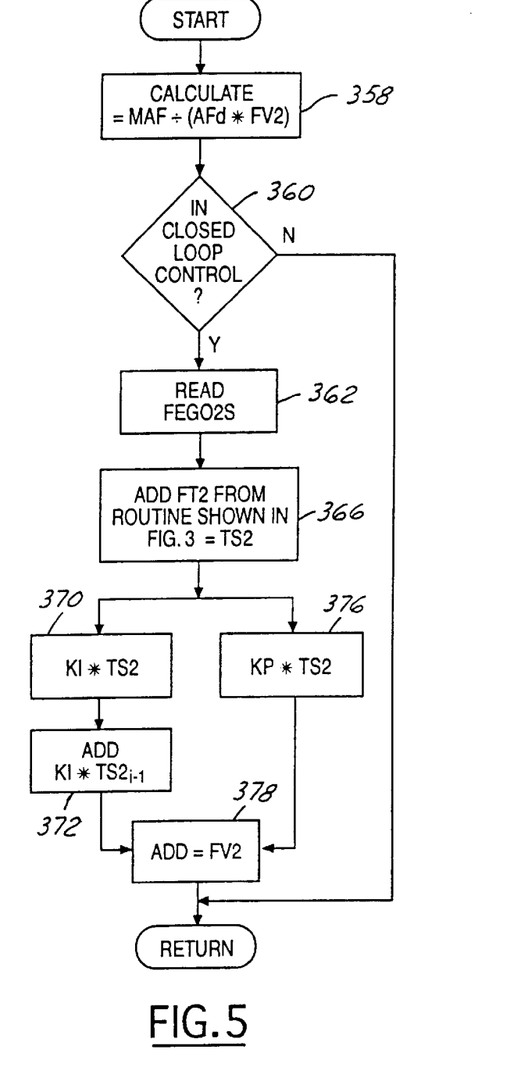

The routine executed by controller 10 to generate the desired quantity of liquid fuel delivered to the second bank of engine 28 and trimming this desired fuel quantity by a feedback variable related both to sensor 44 and fuel trim signal FT2 is now described with reference to FIG. 5. During step 358, an open-loop fuel quantity is first determined by dividing measurement of inducted mass airflow (MAF) by desired air/fuel ratio AFd which is typically the stoichiometric value for gasoline combustion. This open-loop fuel charge is then adjusted, in this example divided, by feedback variable FV2.

After determination that closed-loop control is desired (step 360) by monitoring engine operating conditions such as temperature (T), signal FEGO2S is read during step 362. During step 366, fuel trim signal FT2 is transferred from the routine previously described with reference to FIG. 3 and added to signal FEGO2S to generate trim signal TS2.

During steps 370–378, a conventional proportional plus integral feedback routine is executed with trimmed signal TS2 as the input. Trim signal TS2 is first multiplied by integral gain value KI (step 370), and the resulting product added to the previously accumulated products (step 372). That is, trim signal TS2 is integrated in steps determined by gain constant KI each sample period (i) during step 372. A product of proportional gain KP times trimmed signal TS2 (step 376) is then added to the integration of $KI*TS2$ during step 378 to generate feedback variable FV2.

Figure 6A:
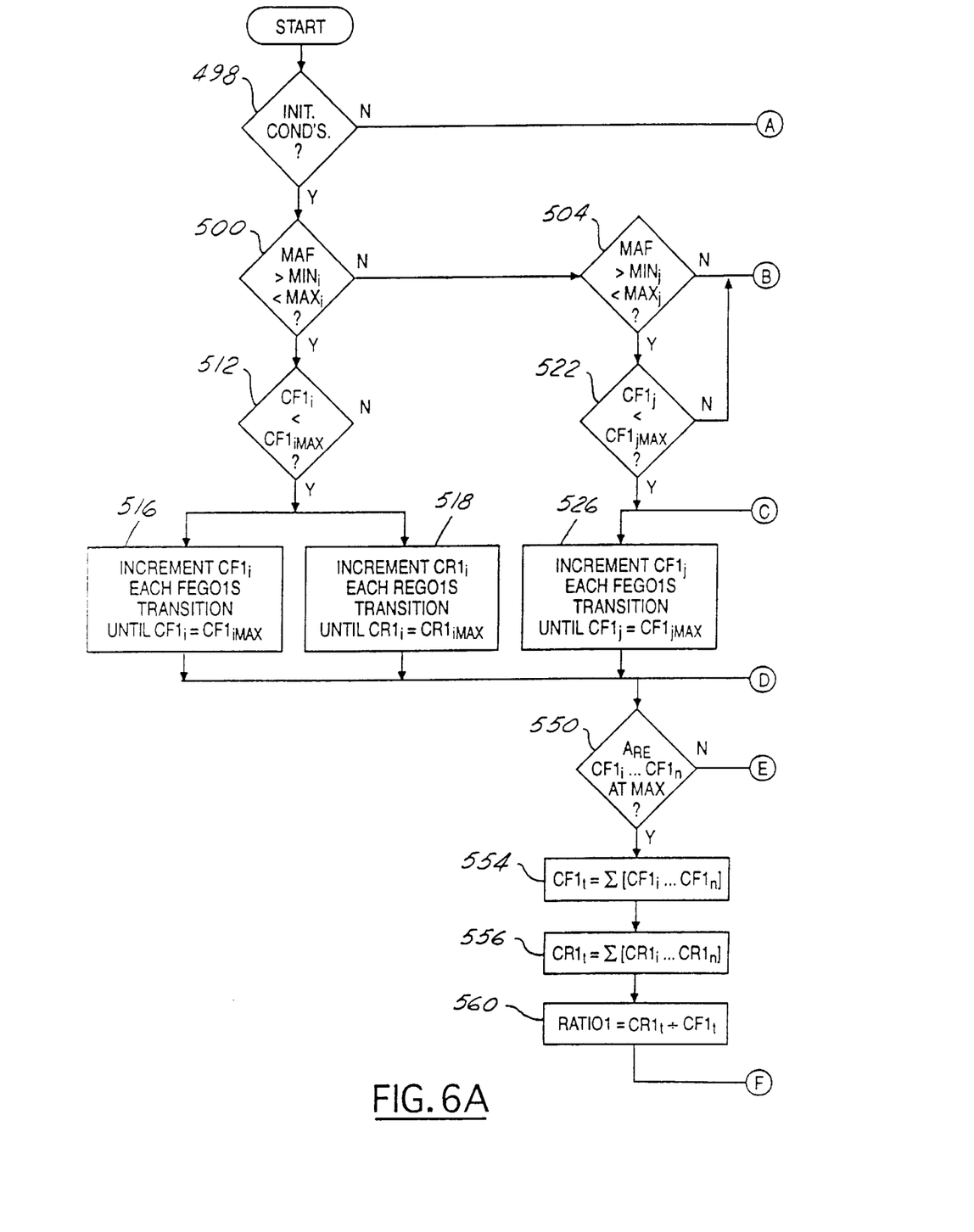
Figure 6B:
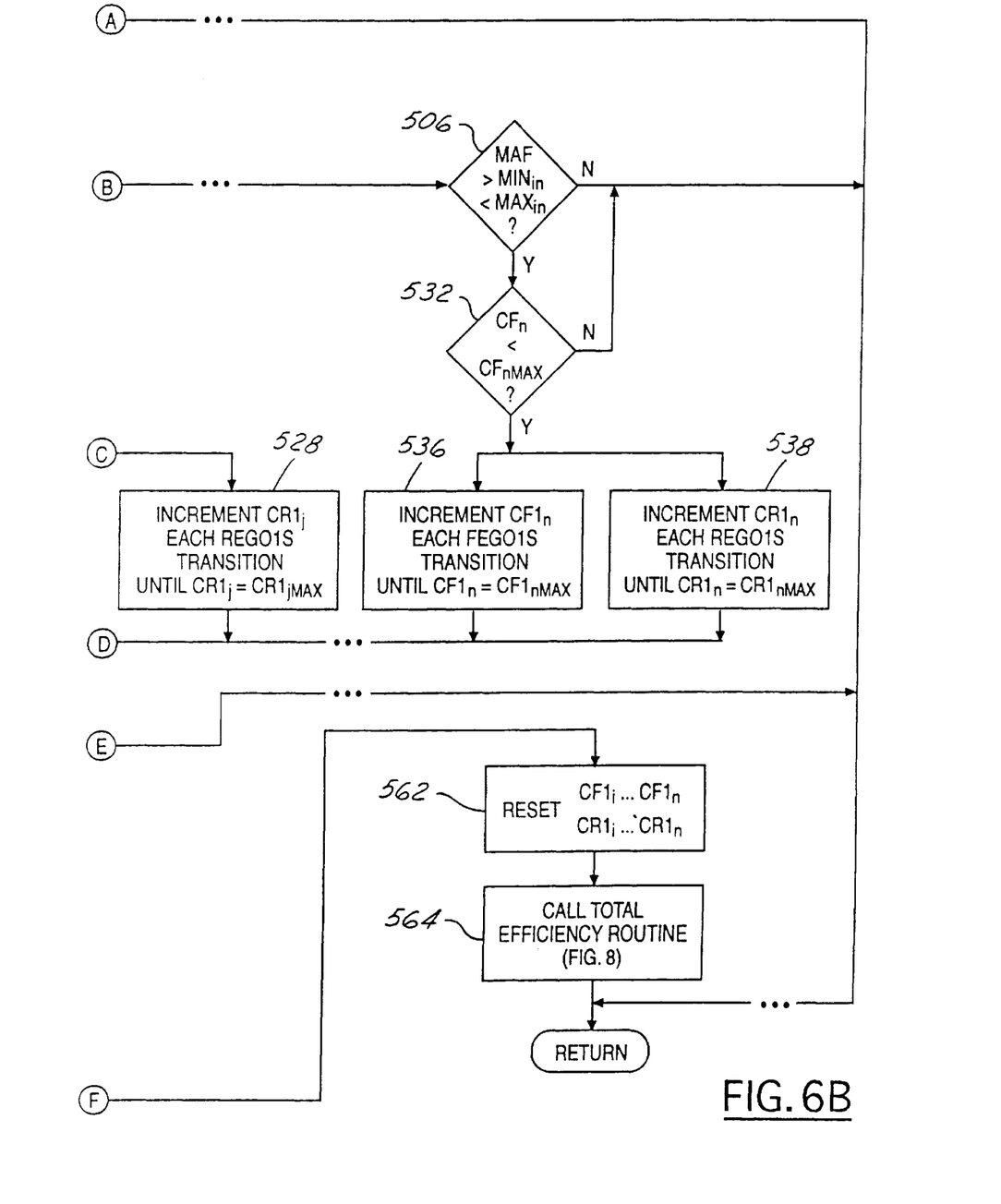

An example of testing converter efficiency of the first engine bank is now described with particular reference to the flowchart shown in FIG. 6. During step 498, initial engine conditions are checked before entering the test cycle described below. More specifically, engine temperature (T) should be within a predetermine range, a predetermined time should have elapsed since the engine was started, and the closed-loop air/fuel control should have been operable for preselected time.

During steps 500, 504, and 506, the inducted airflow range in which engine 28 operating is determined. These ranges are described as range (i), range (j) . . . , range (n) for this example wherein "n" inducted airflow ranges are used to advantage.

Transitions between states of signal FEGO1S are counted to generate count signal $CF1_i$, assuming that engine operation is within airflow range (i). This count is compared to maximum count $CF1_{max}$ during step 512. While engine operation remains within airflow range (i), a test period of predetermined duration is generated by incrementing count $CF1_i$ each transition of signal FEGO1S until count $CF1_i$ is equal to maximum count $CF1_{max}$ (step 516). During this test period (i), count $CR1_i$ is incremented each transition of signal REGO1S (step 518). Stated another way, count $CR1_i$ is incremented each transition of signal REGO1S until count $CR1_i = CR1_{imax}$.

When engine operation is within airflow range (j) as shown in step 504, predetermined period (j), count $CF1_j$, and count $CR1_j$ are determined in steps 522, 526, and 528 in a manner similar to that described above for airflow range (i) with respect to steps 512, 516, and 518. Each transition in signal FEGO1S, count $CF1_j$ is incremented until it reaches maximum count $CF1_{jmax}$ (step 522). Predetermined test period (j) is thereby defined. During test period (j), count $CR1_j$ is incremented each transition of signal REGO1S (step 528).

The above described operation occurs for each airflow range. For example, when engine 28 is operating within airflow range (n) as shown in step 506, test period (n), count $CF1_n$, and count $CR1_n$ are generated as shown in steps 532, 536, and 538.

During step 550, a determination is made as to whether engine 28 has operated in all airflow ranges (i . . . n) for the respective test periods (i . . . n). Stated another way, step 550 determines when each count of transitions in signal FEGO1S ($CF1_i$, $CF1_j$, . . . $CF1_n$) have reached their respective maximum values ($CF1_{imax}$, $CF1_{jmax}$, . . . $CF1_{nmax}$).

Each count ($CF1_i$ . . . $CF1_n$) of transitions in signal FEGO1S for respective test periods (i . . . n) are summed in step 554 to generate total count $CF1_t$. For reasons described above, the same total count $CF1_t$ may be obtained by summing each maximum count ($CF1_{imax}$ . . . $CF1_{nmax}$) for respective test periods (i . . . n)

Total count $CR1_t$ is generated in step 556 by summing each count ($CR1_i$ . . . $CR1_n$) for respective test periods (i . . . n). A ratio of total count $CR1_t$ to total count $CF1_t$ is then calculated during step 560 and all counts subsequently reset in step 562. The total efficiency routine is called in step 564.

Figure 7A:
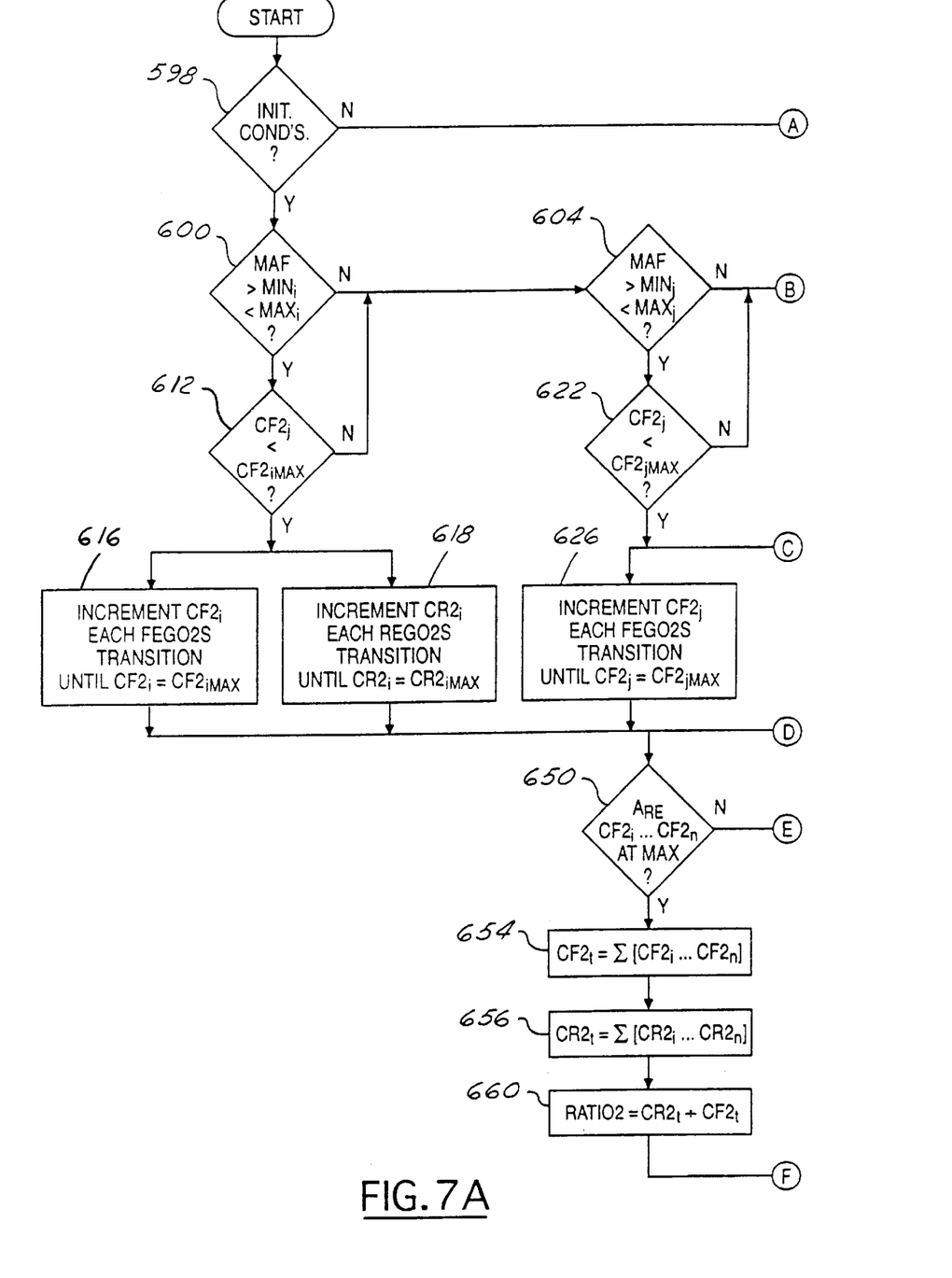
Figure 7B:
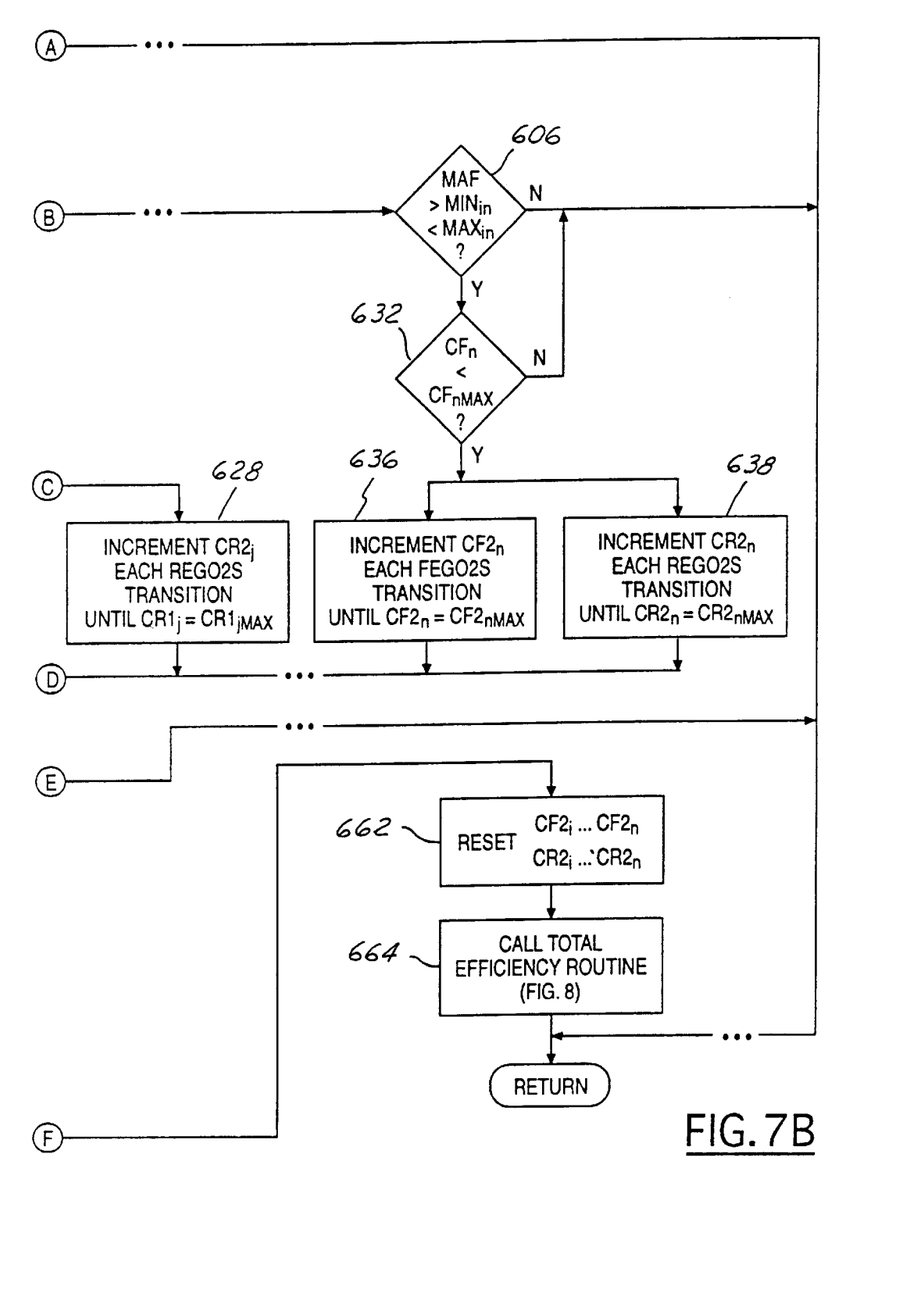

An example of testing converter efficiency of the second engine bank is now described with particular reference to the flowchart shown in FIG. 7. During step 598, initial engine conditions are checked before entering the test cycle described below. More specifically, engine temperature (T) should be within a predetermine range, a predetermined time should have elapsed since the engine was started, and the closed-loop air/fuel control should have been operable for preselected time.

During steps 600, 604, and 606, the inducted airflow range in which engine 28 operating is determined. These ranges are described as range (i), range (j) . . . , range (n) for this example wherein "n" inducted airflow ranges are used to advantage.

Assuming engine operation is within airflow range (i), transitions between states of signal FEGO2S are counted to generate count signal $CF2_i$. This count is compared to maximum count $CF2_{max}$ during step 612. While engine operation remains within airflow range (i), a test period of predetermined duration is generated by incrementing count $CF2_i$ each transition of signal FEGO2S until count $CF2_i$ is equal to maximum count $CF2_{max}$ (step 616). During this test period (i), count $CR2_i$ is incremented each transition of signal REGO2S (step 618). Stated another way, count $CR2_i$ is incremented each transition of signal REGO2S until count $CR2_i = CR2_{imax}$.

When engine operation is within airflow range (j) as shown in step 604, predetermined period (j), count $CF2_j$, and count $CR2_j$ are determined in steps 622, 626, and 628 in a manner similar to that described above for airflow range (i) with respect to steps 612, 616, and 618. Each transition in signal FEGO2S, count $CF2_j$ is incremented until it reaches maximum count $CF2_{jmax}$ (step 622). Predetermined test period (j) is thereby defined. During test period (j), count $CR2_j$ is increment each transition of signal REGO2S (step 628).

The above described operation occurs for each airflow range. For example, when engine 28 is operating within airflow range (n) as shown in step 606, test period (n), count $CF2_n$, and count $CR2_n$ are generated as shown in steps 632, 636, and 638.

During step 650, a determination is made as to whether engine 28 has operated in all airflow ranges (i . . . n) for the respective test periods (i . . . n). Stated another way, step 650 determines when each count of transitions in signal FEGO2S ($CF2_i$, $CF2_j$, . . . $CF2_n$) have reached their respective maximum values ($CF2_{imax}$, $CF2_{jmax}$, . . . $CF2_{nmax}$).

Each count ($CF2_i$ . . . $CF2_n$) of transitions in signal FEGO2S for respective test periods (i . . . n) are summed in step 654 to generate total count $CF2_t$. For reasons described above, the same total count $CF2_t$ may be obtained by summing each maximum count ($CF2_{imax}$ . . . $CF2_{nmax}$) for respective test periods (i . . . n)

Total count $CR2_t$ is generated in step 656 by summing each count ($CR2_i$ . . . $CR2_n$) for respective test periods (i . . . n). A ratio of total count $CR2_t$ to total count $CF2_t$ is then calculated during step 660 and all counts subsequently reset in step 662. The total efficiency routine is called in step 664.

The actual ratios calculated in step 560 and 660 may are used to provide a measurement of converter efficiencies. Due to the advantages described previously herein, this indication of converter efficiency is accurate over a wider range of converter efficiencies than heretofore possible.

The total efficiency routine for determining when combined catalytic converter efficiency has degraded below a predetermined level is now described with particular reference to FIG. 8. When RATIO1 is greater than a first predetermined threshold (Thresh1) or RATIO2 is greater than the first predetermined threshold (Thresh1) (step 800) then a flag is set indicating that the combined catalytic converter efficiency has degraded below a predetermined level (step 801). If not, when RATIO1 is greater than a second predetermined threshold (Thresh2) and RATIO2 is greater than a third predetermined threshold (Thresh3) (step 802) then a flag is set indicating that the combined catalytic converter efficiency has degraded below a predetermined level (step 801). If not, when RATIO2 is greater than the second predetermined threshold (Thresh2) and RATIO1 is greater than the third predetermined threshold (Thresh3) (step 804) then a flag is set indicating that the combined catalytic converter efficiency has degraded below a predetermined level (step 801).

Figure 8:
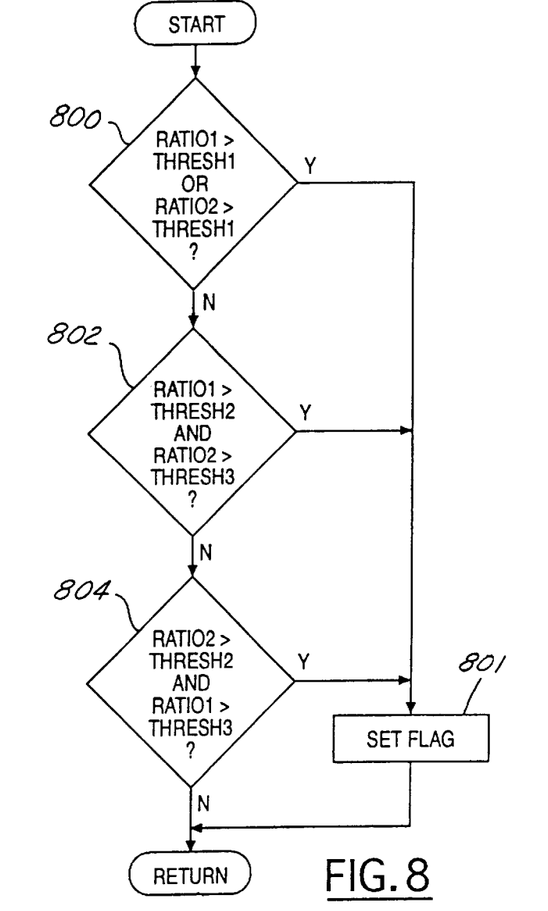
Figure 9:
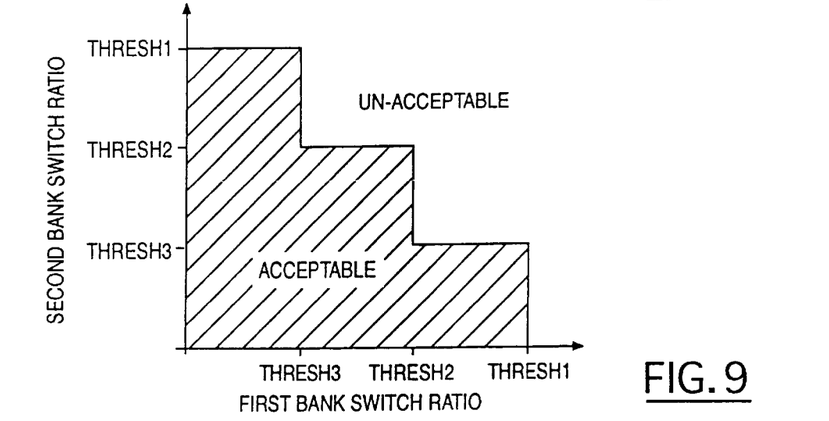
FIG. 9 is a graphical representation of an example of an aspect of the invention.

FIG. 9 shows an example of a curve described by the routine in FIG. 8. When the combined plot of first and second bank switch ratios (RATIO1 and RATIO2) fall within the cross-hatched region, the combined catalytic converter efficiency is within acceptable limits. When the combined plot of first and second bank switch ratios (RATIO1 and RATIO2) fall outside the cross-hatched region, the flag is set indicating that the combined catalytic converter efficiency has degraded below a predetermined level.

An example of operation has been presented wherein the routine described in FIG. 8 represents a piece-wise linear curve separating acceptable and unacceptable combinations of first and second bank switch ratios. Alternatively, the routine described in FIG. 8 could be reconfigured by one of ordinary skill in the art to represent any possible two-dimensional curve. The curve could be determined by experimental testing, theoretical models, any combination of the two, or any other method known to those skilled in the art and suggested by this disclosure. Also, the method could be reconfigured so that a function of RATIO1 and RATIO2 (for example, an elliptical function described by the function f below) could be compared to a single predetermined number.

$$f = \left(\frac{RATIO1}{A}\right)^2 + \left(\frac{RATIO2}{B}\right)^2$$

Although one example of an embodiment which practices the invention has been described herein, there are numerous other examples which could also be described. For example, the invention may be used to advantage with carbureted engines, proportional exhaust gas oxygen sensors, and engines having an in-line configuration rather than a V-configuration. The invention is therefore to be defined only in accordance with the following claims.

We claim:

1. A catalytic converter monitoring method for an internal combustion engine with a first group of cylinders coupled to a first catalytic converter and a second group of cylinders coupled to a second catalytic converter, the method comprising the steps of:

measuring a first number of transitions from a first state to a second state of a first exhaust gas oxygen sensor positioned upstream of the first catalytic converter;

measuring a second number of transitions from said first state to said second state of a second exhaust gas oxygen sensor positioned downstream of the first catalytic converter;

measuring a third number of transitions from said first state to said second state of a third exhaust gas oxygen sensor positioned upstream of the second catalytic converter;

measuring a fourth number of transitions from said first state to said second state of a fourth exhaust gas oxygen sensor positioned downstream of the second catalytic converter; and determining a degradation of the first and second catalytic converters derived from a combination of a first ratio between said first and second number of transitions and a second ratio between said third and fourth number of transitions.

2. A catalytic converter monitoring method for an internal combustion engine with a first group of cylinders coupled to a first catalytic converter and a second group of cylinders coupled to a second catalytic converter, the method comprising the steps of:

measuring a first number of transitions from a first state to a second state of a first exhaust gas oxygen sensor positioned downstream of the first catalytic converter;

measuring a second number of transitions from said first state to said second state of a second exhaust gas oxygen sensor positioned upstream of the first catalytic converter;

measuring a third number of transitions from said first state to said second state of a third exhaust gas oxygen sensor positioned downstream of the second catalytic converter;

measuring a fourth number of transitions from said first state to said second state of a fourth exhaust gas oxygen sensor positioned upstream of the second catalytic converter;

determining a degradation of the first and second catalytic converters derived by comparing a combination of a first ratio between said first and second number of transitions and a second ratio between said third and fourth number of transitions to a total system threshold.

3. The method recited in claim 2 wherein said determining step further comprises the step of determining a degradation of the first and second catalytic converters by creating an elliptical combination of said first ratio and said second ratio and comparing said elliptical combination to said total system threshold.

4. The method recited in claim 2 wherein said determining step further comprises the step of determining a degradation of the first and second catalytic converters by comparing a two-dimensional plot of said first ratio and said second ratio to a predetermined two dimensional curve.

5. A catalytic converter monitoring method for an internal combustion engine with a first group of cylinders coupled to a first catalytic converter and a second group of cylinders coupled to a second catalytic converter, the method comprising the steps of:

measuring a first number of transitions from a first state to a second state of a first exhaust gas oxygen sensor positioned upstream of the first catalytic converter;

measuring a second number of transitions from said first state to said second state of a second exhaust gas oxygen sensor positioned upstream of a second catalytic converter;

indicating a first catalytic converter efficiency of the first catalytic converter by calculating a first ratio between said first number of transitions in said first upstream exhaust gas oxygen sensor to transitions in a first downstream exhaust gas oxygen sensor position downstream of the first catalytic converter;

indicating a second catalytic converter efficiency of the second catalytic converter by calculating a second ratio between said second number of transitions in said second upstream exhaust gas oxygen sensor to transitions in a second downstream exhaust gas oxygen sensor position downstream of the second catalytic converter; and determining degradation of the first and second catalytic converters from a combination of said first and second catalytic converter efficiencies.

6. A catalytic converter monitoring method for an internal combustion engine with a first group of cylinders coupled to a first catalytic converter and a second group of cylinders coupled to a second catalytic converter, the method comprising the steps of:

measuring a first number of transitions from a first state to a second state of a first exhaust gas oxygen sensor positioned downstream of the first catalytic converter;

measuring a second number of transitions from said first state to said second state of a second exhaust gas oxygen sensor positioned downstream of the second catalytic converter;

indicating a first catalytic converter efficiency of the first catalytic converter by calculating a first ratio between said first number of transitions in said first upstream exhaust gas oxygen sensor to transitions in a first downstream exhaust gas oxygen sensor position downstream of the first catalytic converter;

indicating a second catalytic converter efficiency of the second catalytic converter by calculating a second ratio between said second number of transitions in said second upstream exhaust gas oxygen sensor to transitions in a second downstream exhaust gas oxygen sensor position downstream of the second catalytic converter; and determining degradation of the first and second catalytic converters by comparing a combination of said first and second catalytic converter efficiencies to a total system threshold.

7. The method recited in claim 6 wherein said determining step further comprises the step of determining a degradation of the first and second catalytic converters by creating an elliptical combination of said first and second catalytic converter efficiencies and comparing said elliptical combination to said total system threshold.

8. The method recited in claim 6 wherein said determining step further comprises the step of determining a degradation of the first and second catalytic converters by comparing a two-dimensional plot of said first and second catalytic converter efficiencies to a predetermined two dimensional curve.

9. A catalytic converter monitoring system for an internal combustion engine with a first group of cylinders coupled to a first catalytic converter and a second group of cylinders coupled to a second catalytic converter, the system comprising:

a first exhaust gas oxygen sensor positioned upstream of the first catalytic converter;

a second exhaust gas oxygen sensor positioned downstream of the first catalytic converter;

a third exhaust gas oxygen sensor positioned upstream of the second catalytic converter;

a fourth exhaust gas oxygen sensor positioned downstream of the second catalytic converter;

a controller measuring a first number of transitions from a first state to a second state of said first exhaust gas oxygen sensor, measuring a second number of transitions from said first state to said second state of said second exhaust gas oxygen sensor, measuring a second number of transitions from said first state to said second state of said third exhaust gas oxygen sensor, measuring a second number of transitions from said first state to said second state of said fourth exhaust gas oxygen sensor, and determining a degradation of the first and second catalytic converters derived from a combination of a first ratio between said first and second number of transitions and a second ratio between said third and fourth number of transitions.

10. A catalytic converter monitoring system for an internal combustion engine with a first group of cylinders coupled to a first catalytic converter and a second group of cylinders coupled to a second catalytic converter, the system comprising:

a first exhaust gas oxygen sensor positioned upstream of the first catalytic converter;

a second exhaust gas oxygen sensor positioned downstream of the first catalytic converter;

a third exhaust gas oxygen sensor positioned upstream of the second catalytic converter;

a fourth exhaust gas oxygen sensor positioned downstream of the second catalytic converter;

a controller measuring a first number of transitions from a first state to a second state of said first exhaust gas oxygen sensor, measuring a second number of transitions from said first state to said second state of said second exhaust gas oxygen sensor, measuring a second number of transitions from said first state to said second state of said third exhaust gas oxygen sensor, measuring a second number of transitions from said first state to said second state of said fourth exhaust gas oxygen sensor, and determining a degradation of the first and second catalytic converters derived by comparing a two-dimensional plot of a first ratio between said first and second number of transitions and a second ratio between said third and fourth number of transitions to a predetermined two-dimensional curve.

11. The system recited in claim 10 further comprising said controller indicating catalytic converter degradation when said two-dimensional plot of said first ratio and said second ratio lies within said predetermined curve.

* * * * *